United States Patent [19]

England

[11] 4,134,651
[45] Jan. 16, 1979

[54] METHOD OF MAKING AN ASSEMBLY

[75] Inventor: Charles J. England, Smallfield, England

[73] Assignee: The Monotype Corporation Limited, Redhill, England

[21] Appl. No.: 826,708

[22] Filed: Aug. 22, 1977

[30] Foreign Application Priority Data

Aug. 31, 1976 [GB] United Kingdom ............... 36066/76

[51] Int. Cl.² .................... G03B 17/08; B29D 11/00
[52] U.S. Cl. ................................. 354/17; 350/178
[58] Field of Search ............... 355/22, 33; 354/5, 12, 354/18, 19, 17, 110, 112, 115; 350/126, 128, 178, 320

[56] References Cited

U.S. PATENT DOCUMENTS

| | | | |
|---|---|---|---|
| 2,382,660 | 8/1945 | Penberthy | 350/178 |
| 2,652,755 | 9/1953 | Higonnet et al. | 354/5 |
| 2,905,068 | 9/1959 | Friedman | 354/12 |
| 2,917,980 | 12/1959 | Grube et al. | 354/17 |
| 2,919,626 | 1/1960 | Bergmann | 350/178 |
| 3,618,487 | 11/1971 | Tiefenthal et al. | 354/17 |
| 3,687,557 | 8/1972 | Odhner | 350/320 X |

Primary Examiner—Donald A. Griffin
Attorney, Agent, or Firm—Morgan, Finnegan, Pine, Foley & Lee

[57] ABSTRACT

A method of making an assembly comprising a support plate with an array of lenslets made from optically refractive material mounted thereon, the support plate being substantially optically transparent at least in the regions adjacent the lenses, the method including, in respect of each lenslet, the steps: positioning the lenslet on the plate with a quantity of adhesive therebetween, the adhesive being curable by electromagnetic radiation in a given wavelength range; and, after checking that the lenslet is in a required position relative to the support plate, applying electromagnetic radiation within said wavelength range to the adhesive through the lens and/or the plate to cure the adhesive and fix the lenslet to the plate. The checking step includes observing an image, formed by an optical system including the lenslet, of a reference mark and adjusting the position of the lenslet on the support plate until the observed image is exactly in a predetermined position in an image plane. An assembly made by the method and a photocomposing machine incorporating such an assembly.

17 Claims, 3 Drawing Figures

METHOD OF MAKING AN ASSEMBLY

FIELD OF THE INVENTION

This invention relates to a method of joining together elements to make an assembly and more particularly to a method employing an adhesive which is cured from the liquid state when subjected to electromagnetic radiation of a wavelength lying in a known range.

The adhesive may, for example, be curable in ultraviolet light. Adhesives of this type are commercially available.

Adhesives which are not only curable as hereinabove mentioned but are also optically transparent are available. As used herein, the term optically transparent means transparent to electromagnetic radiation of a wavelength lying within the wavelength spectrum of infra-red, visible, and ultra-violet radiation. Such adhesives are particularly useful in the field of optics where at least one of the elements, which may be that one through which electromagnetic radiation is applied to the adhesive, is optically transparent. This element may, for example, be a glass plano-concave or a plano-convex lens, the adhesive being trapped between the flat surface thereof, and a flat surface of a mounting plate, such as a transparent glass plate, to make an optical assembly.

BACKGROUND TO THE INVENTION

Commonly it is essential that, for proper operation of optical apparatus of which the assembly will form a part, the elements of the assembly be precisely positioned with respect to one another; in the example mentioned the position of the lens in the plane of the flat surface of the mounting plate may be critical. A method in accordance with the present invention permits adjustment of the optical elements while the adhesive is still liquid until the correct relative positioning is achieved, this being ascertainable by an appropriate optical technique, and the subsequent rapid curing of the adhesive by flooding the elements with the electromagnetic radiation to fix these elements in the desired position.

This possibility is of significance in the field of photocomposition, and more particularly in the photocomposing technique employing a fixed character font carrying an array of characters, and an assembly of small lenses, one for each character, herein referred to as lenslets, the lenslets being arranged in an array corresponding to the array of characters in the font, such that when the assembly is correctly located in the photocomposing machine, the array of lenslets is disposed in a plane forward of the character font, which may comprise an opaque plate carrying an array of transparent characters, each lenslet being displaced from its respective character by a distance corresponding to its focal length. When the character font is suitably illuminated from behind, light carrying character information is collimated when passing through the individual lenslets and thereafter passes to a suitable optical system which focusses the characters onto a photosensitive recording element such as a photographic plate or film. This optical system is such that the images of each of the characters can be focussed at a single common image position and accordingly, by appropriate sequential selection of the characters projected from the lenslet assembly and intermittent displacement of the photosensitive recording element relative to this common image position, the exposed characters can be arranged side by side to produce successive lines of text composition on the recording element, while the character font remains stationary.

To obtain high quality composition with accurate alignment and justification of the characters, it is necessary to ensure that images of all of the characters are precisely located at the common image position. This requires a high degree of accuracy in the positioning of the characters in the font and of the lenslets in the lenslet assembly, to ensure that each lenslet aligns accurately with its respective character in the font plate in the assembled apparatus. The process by which the font is produced, usually a photographic process, readily permits such accuracy in character positioning to be obtained. The required accuracy in lenslets positioning is, however, not so readily achieved and heretofore the techniques employed have involved complicated and costly mechanical arrangements for the individual adjustment of the positions of the lenslets, or alternatively individual optical assemblies of lenses and adjustable prisms to alter laterally the positions of the light beams leaving the lenslets, after incorporating the assembly in the machine.

A method according to the present invention may be employed to advantage in this field of photocomposition, to make an assembly with the lenslets adjusted and fixed prior to the mounting of the assembly in the machine.

SUMMARY OF THE INVENTION

Thus, according to this particular aspect of the invention there is provided a method of making an assembly comprising a support plate with an array of lenslets made from optically refractive material mounted thereon, the support plate being substantially optically transparent at least in the regions adjacent the lenses, the method including, in respect of each lenslet, the steps: positioning the lenslet on the plate with a quantity of adhesive therebetween, the adhesive being curable by electromagnetic radiation in a given wavelength range; and, after checking that the lenslet is in a required position relative to the support plate, applying electromagnetic radiation within said wavelength range to the adhesive through the lens and/or the plate to cure the adhesive and fix the lenslet to the plate.

Preferably the checking step includes observing an image, formed in an image plane by an optical system including the lenslet, of a reference mark, and adjusting the position of the lenslet on the support plate until the observed image is located in a predetermined manner with respect to fixed reference data.

The lenslets are preferably positioned, adjusted and fixed successively, that is to say, one at a time.

Preferably a master matrix which is fixed relative to the support plate carries an array of said reference marks, a different mark being observed for each lenslet, and the optical system also includes a converging lens which is common to the optical systems including the respective lenslets.

Preferably the lenslets each form a collimated beam from the respective reference marks from which the common converging lens forms the respective images.

The reference marks may comprise the cross points of a grid of fine lines carried by the master matrix.

The electromagnetic radiation may be ultra-violet light from a source and reflected into the converging lens by a mirror which is moved for this purpose onto the axis of the converging lens and disposed obliquely thereto and on the side thereof opposite the support plate.

The adhesive is preferably curable only under anaerobic conditions so that surplus adhesive around the lens will not be cured and can be readily removed after completion of the assembly.

BRIEF DESCRIPTION OF THE DRAWINGS

A particular embodiment in accord with this latter aspect of the invention will now be described by way of example, with reference to the accompanying drawings, in which:-

Figure 3:
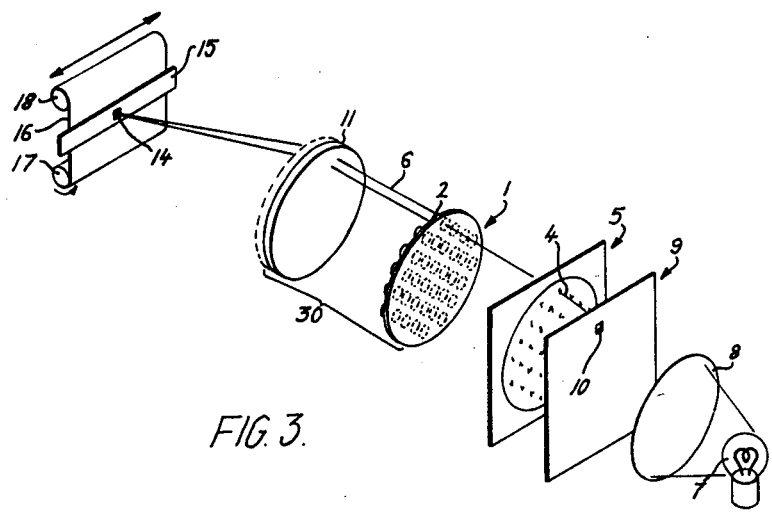
FIG. 3 illustrates schematically the optical system of a photocomposing machine employing the lenslet assembly of FIG. 2.

The lenslet assembly is indicated by reference 1. As explained earlier, and as seen in FIG. 3 when assembled in the photocomposing apparatus, each of the lenslets 2 in the array incorporated in the assembly 1 is placed in front of a respective character 4 of a character font 5 so that the character is in one of the principal focal planes of the lenslet. The character is illuminated by means of a light source 7, a condenser lens 8 and a shutter assembly 9 defining a displaceable shutter aperture 10, and light leaving the lenslet from any point on the character is then in the form of a collimated parallel beam 6. A converging combining lens 11 sufficiently large to encompass the collimated beams from all of the lenslets 2 of the assembly then focusses the character images. From the laws of optics it can be shown that the light from corresponding reference points in the areas of the font occupied by the characters will recombine at a particular spot in the rear focal plane of the large lens. Accordingly, as mentioned above, all of the images of the character array can be superimposed at a common image position on a photosensitive recording member, and if characters are selected in predetermined sequence as for phototype setting, the images will occur seriatim on a particular aperture 14 in an aperture plate 15 suitable for placing in sequence on film 16 moving relative to the aperture by the correct amount between successive exposures. In the photocomposing machine illustrated in FIG. 3 the film 16 is wound vertically from a feed spool 17 to a take-up spool 18, to advance the film between successive lines of characters, and is moved horizontally between exposure to successive characters in a line.

Figure 1:
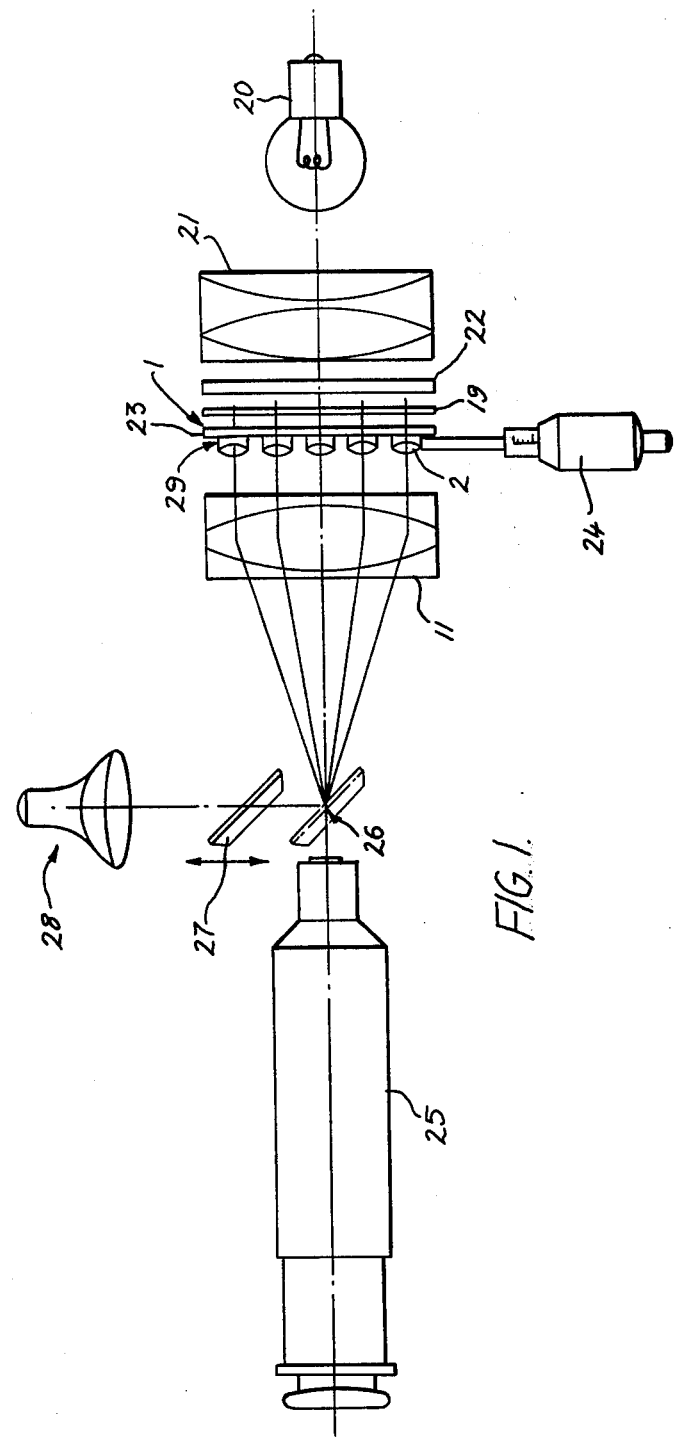
FIG. 1 illustrates schematically an optical system employed in a method of making a lenslet assembly.
Figure 2:
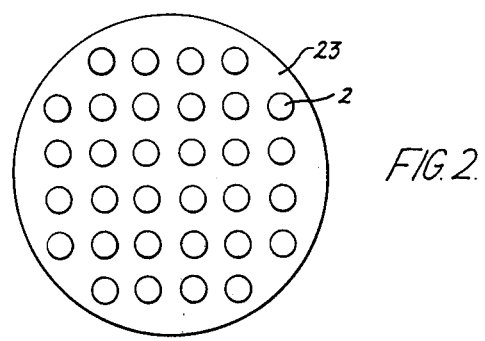
FIG. 2 is a front elevational view of a lenslet assembly.

With reference to FIG. 1, a master matrix array 19 carries means, in this instance a grid of precise crossed hairlines, to define a particular reference mark or point in this case the cross points of the grid, for each character position. These reference points may correspond to the exact centres of the areas occupied by the characters on the font, thereby providing an accurate representation of the character positions in the font. This matrix array is arranged to be illuminated by an illumination source 20 and condenser lens 21. A shutter 22 is arranged to illuminate the reference marks selectively one at a time while the associated lenslet is being positioned upon a plain glass support plate 23. This support plate is held parallel to the matrix array 19, and a large converging combining lens 11 is held in front of the support plate to focus the collimated beams from the individual lenslets 2 in an image plane. The support plate 23 and lens 11 are mounted in a common support, or housing (not shown) to form a lens unit 30.

Each lenslet has a flat rear surface onto which a spot of a suitable clear adhesive is applied. The adhesive used is one which is cured when exposed to electromagnetic radiation of a particular type. One such material which is currently available and is sold under the name Loctite 358 is cured when exposed to ultra-violet light.

After application of the adhesive the lenslet is placed in a locating tool 24 with its rear surface against the plate 23 and with its optical axis extending through the support plate 23. The tool 24 permits the two-dimensional adjustment of the position of the lenslet in the plane of the plate 23 by means of micrometer adjustment. The image of the cross point associated with the lenslet being positioned is observed with great precision using a microscope 25, and the lenslet is adjusted until the observed image of the reference mark is correctly located at a particular image position 26 in the image plane indicated by appropriate fixed data in that plane.

A mirror 27 is then moved from a non-operative position, shown in full lines, to an operative position, shown in broken lines, in which it is disposed on the optical axis of the system, and oblique thereto, and an ultra-violet light source 28 is energised. The ultra-violet light floods the lenslet causing a molecular change in, and thereby curing the small amount of adhesive 29 trapped between the lenslet rear face and the flat glass support plate 23. The adhesive is preferably curable only in anaerobic conditions so that any surplus adhesive around the periphery of the lenslet is not cured thereby facilitating subsequent removal using a suitable solvent. Accordingly the lenslet 2 is fixed in its carefully adjusted and precise position.

This process of lenslet positioning and fixing is repeated with successive lenslets until the whole array is completed, with a lenslet for each character on the font of which the character positions are represented by the grid points on the matrix array 19.

The lens unit comprising lenslet assembly 1 and the combining lens 11 is then transferred to the photocomposing machine in use of which the points on the characters corresponding to the grid points of the matrix array will recombine at a precise point on the film surface, and thus all other corresponding points on the characters will recombine at respective points on the film so that the image positions are precisely superimposed. By controlled movement of the film in relation to the common image position, and in proper synchronisation with the operation of the shutter mechanism of the apparatus for selecting the sequence for character projection, exposure of the film to properly aligned and justified rows of characters can be achieved.

I claim:

1. A method of making an assembly comprising a support plate with an array of lenslets made from optically refractive material mounted thereon, the support plate being substantially optically transparent at least in the regions adjacent the lenses, the method including, in respect of each lenslet, the steps of:

positioning the lenslet on the plate with a quantity of adhesive between a surface of the lenslet and a surface portion of the support plate, each of said surfaces being perpendicular to the optical axis of the lenslet and the adhesive being curable by electromagnetic radiation in a given wavelength range;
   checking that the lenslet is in a required position relative to the support plate; and after said checking step, applying electromagnetic radiation within said wavelength range to the adhesive through the lens to cure the adhesive and fix the lenslet to the plate.

2. A method according to claim 1 in which said checking includes observing an image formed in an image plane by an optical system including the lenslet, of a reference mark, and adjusting the position of the lenslet on the support plate until the observed image is located in a predetermined manner with respect to fixed reference data.

3. A method according to claim 2 wherein the lenslets are positioned, adjusted and fixed one at a time.

4. A method according to claim 2 wherein a master matrix which, during performance of the method is held fixed relative to the support plate, carries an array of said reference marks, a different mark image being observed for each lenslet.

5. A method according to claim 4 wherein said optical system also includes a converging lens which is common to the optical systems including the respective lenslets, and which focuses said images of said marks in said image plane, said lenslets being adjusted to cause the images of the respective reference marks to be positioned at a common image position defined by said fixed reference data, in said image plane.

6. A method according to claim 5 in which the lenslets form respective collimated beams carrying information concerning the respective reference marks, from which beams the common converging lens forms the respective images.

7. A method according to claim 4 wherein the reference marks comprise cross points of a grid of fine lines carried by the master matrix.

8. A method according to claim 2 wherein the electromagnetic radiation is applied through the lenslets and is directed thereto from a radiation source by a mirror which is moved for this purpose into the path of the light travelling from the lenslets and forming said images.

9. A method according to claim 1 wherein said electromagnetic radiation for curing the adhesive lies within the ultra-violet wavelength range.

10. An assembly comprising a support plate with an array of lenslets made from optically refractive material mounted thereon, the support plate being substantially optically transparent at least in the regions adjacent the lenslets, the said lenslets each being fixed along one surface to a surface portion of said support plate with its optical axis extending through said support plate, by means of an optically transparent adhesive cured by the application of electromagnetic radiation, each said surface portion of said support plate being perpendicular to the optical axis of its adjacent lenslet and said adhesive being provided between said one surface of each said lenslet and each said surface portion of said support plate.

11. An assembly according to claim 10 wherein said adhesive is one which is cured by the application of ultra-violet light.

12. A photocomposing machine having means for positioning a photosensitive element, a character font carrying an array of characters, means for illuminating said font to produce beams of light carrying information concerning the respective characters, an assembly according to claim 10 in which the mutual spacing of the lenslets on the support plate corresponds to the mutual spacing of the characters of said font, the array of lenslets being disposed in a plane forward of the character font and arranged so that each of said beams can pass through a respective lenslet, an optical system for focusing said beams from said lenslets to project images of said characters onto said photosensitive elements, and means for selecting the characters to be so projected.

13. A photocomposing machine according to claim 12 wherein each lenslet is displaced from its respective character in the font by a distance corresponding to its focal length so that said lenslets collimate the respective beams, wherein the optical system is adapted to focus said beams to project said images of the characters at a single common image position, and wherein means are provided for displacing said photosensitive element relative to said single common image position.

14. A method of making an assembly comprising a support plate with an array of lenslets made from optically refractive material mounted thereon, the support plate being substantially optically transparent at least in the regions adjacent the lenses, the method including, in respect of each lenslet, the steps of:

positioning the lenslet on the plate with a quantity of adhesive therebetween, the adhesive being curable by electromagnetic radiation in a given wavelength range;

checking that the lenslet is in a required position relative to the support plate by observing an image formed in an image plane by an optical system including the lenslet of a separate reference mark for each lenslet, said reference mark being one of an array of reference marks formed on a master matrix which is held fixed relative to the support plate;

adjusting the position of the lenslet on the support plate until the observed image is located in a predetermined manner with respect to fixed reference data; and applying, after said checking and adjusting steps, electromagnetic radiation within said wavelength range to the adhesive through the lens to cure the adhesive and fix the lenslet to the plate.

15. A method according to claim 14 wherein said optical system also includes a converging lens which is common to the optical systems including the respective lenslets, and which focuses said images of said marks in said image plane, said lenslets being adjusted to cause the images of the respective reference marks to be positioned at a common image position defined by said fixed reference data, in said image plane.

16. A method according to claim 15 in which the lenslets form respective collimated beams carrying information concerning the respective reference marks, from which beams the common converging lens forms the respective images.

17. A method according to claim 14 wherein the reference marks comprise cross points of a grid of fine lines carried by the master matrix.

* * * * *